United States Patent Office 3,784,667
Patented Jan. 8, 1974

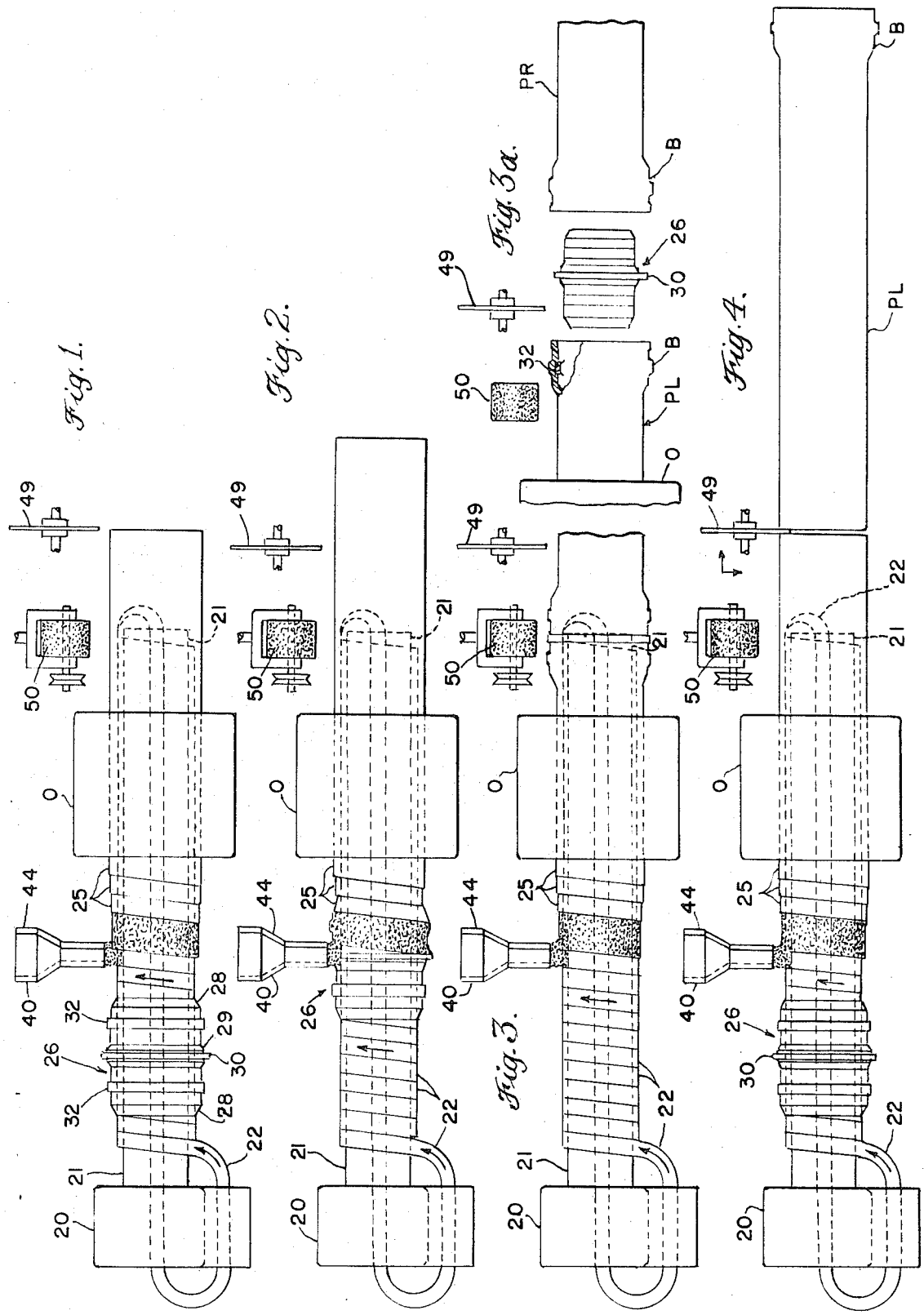

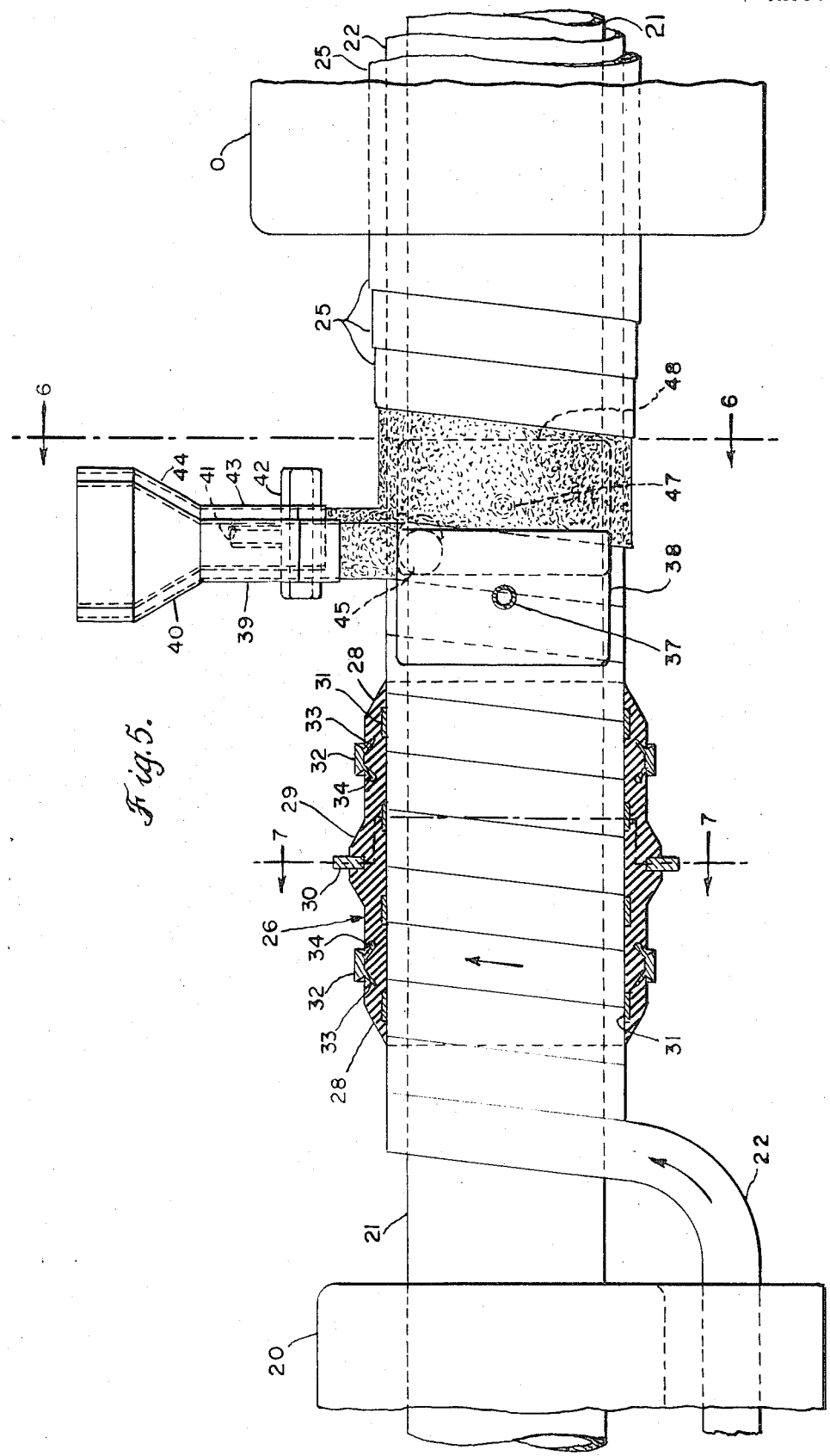

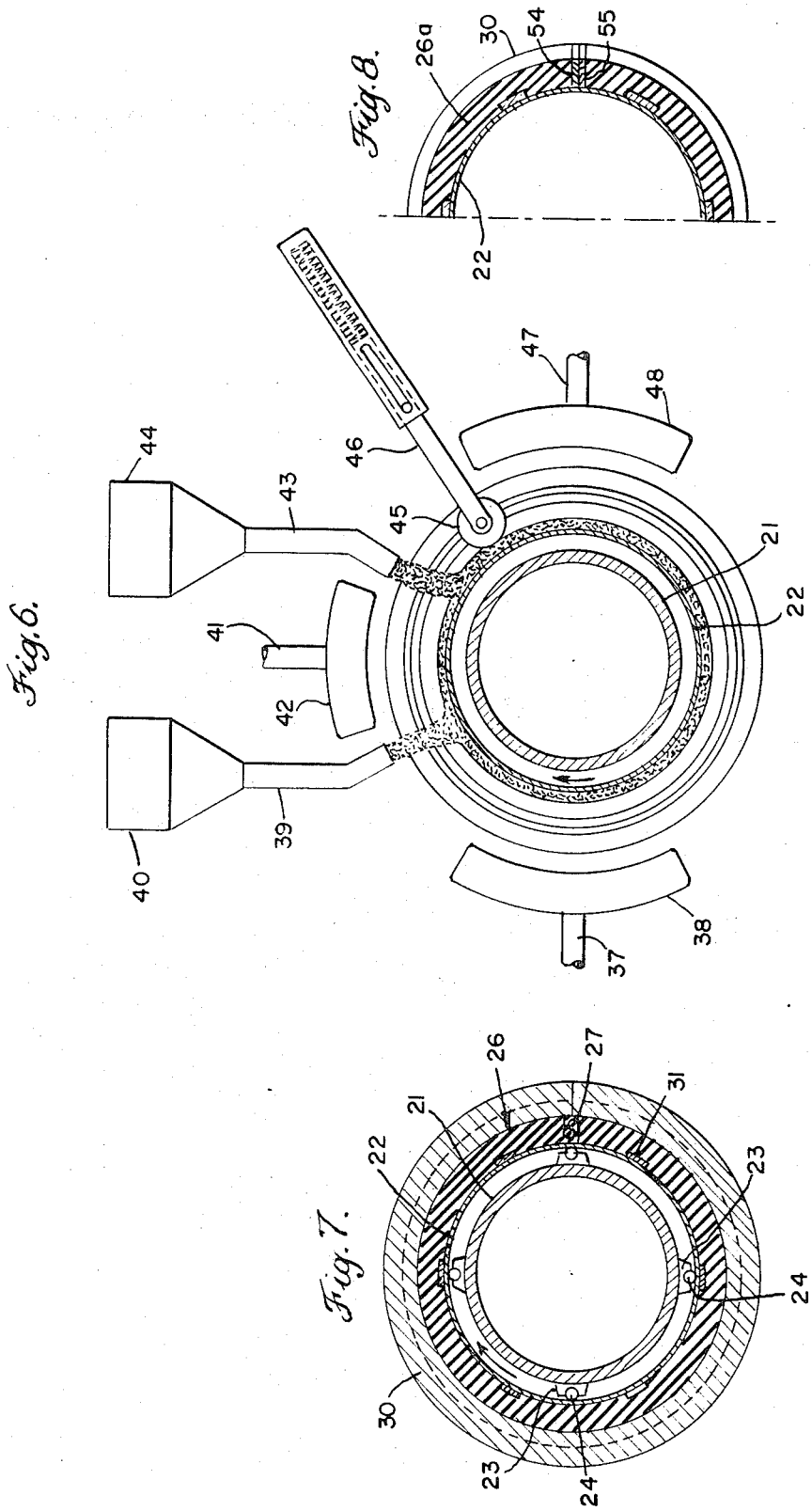

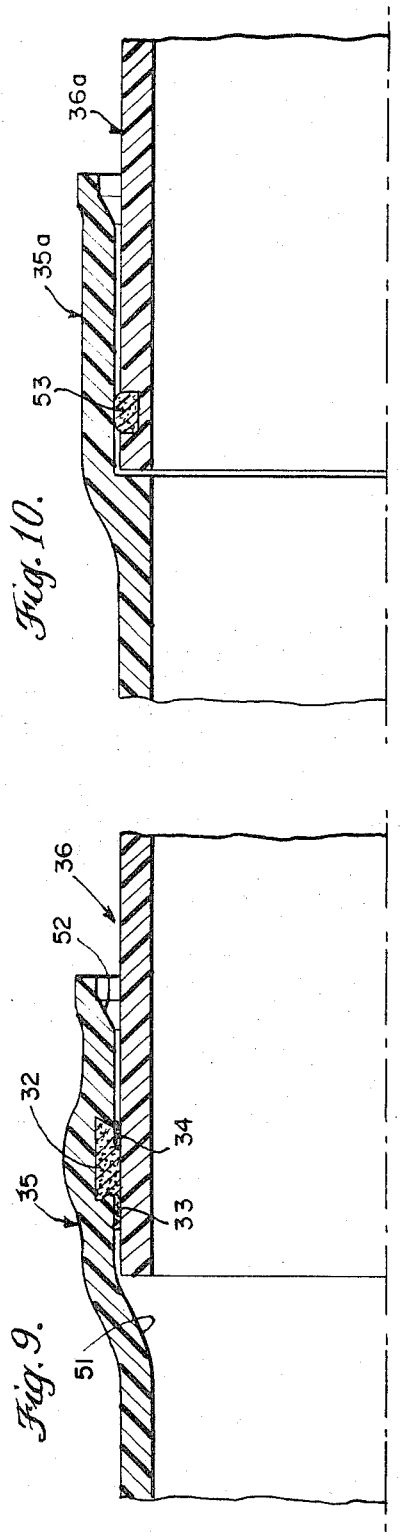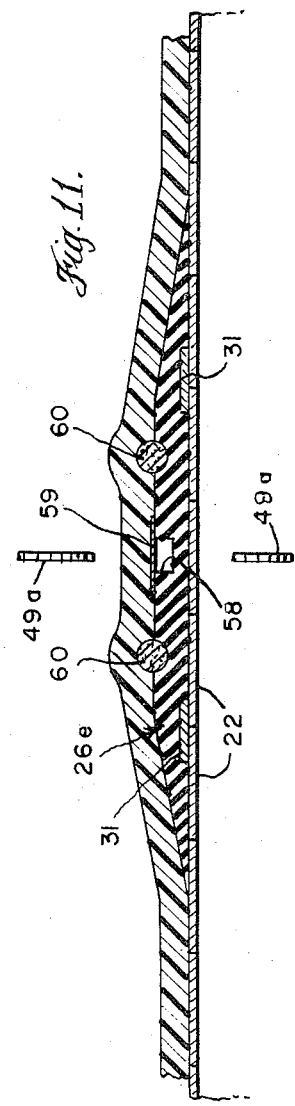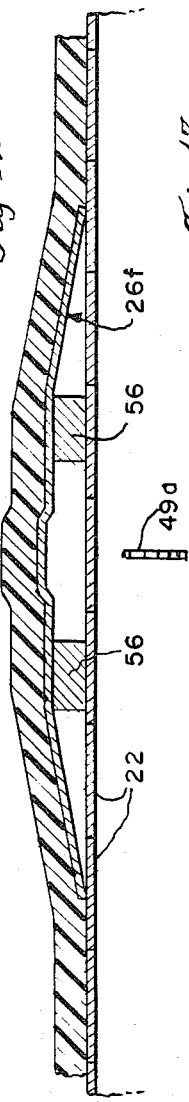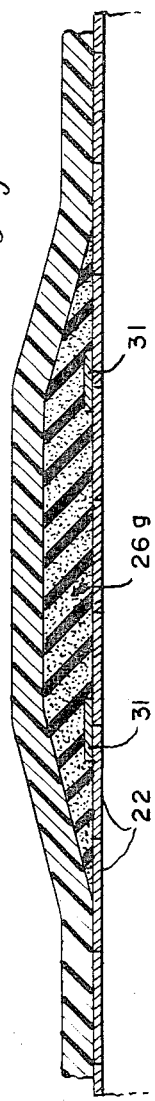

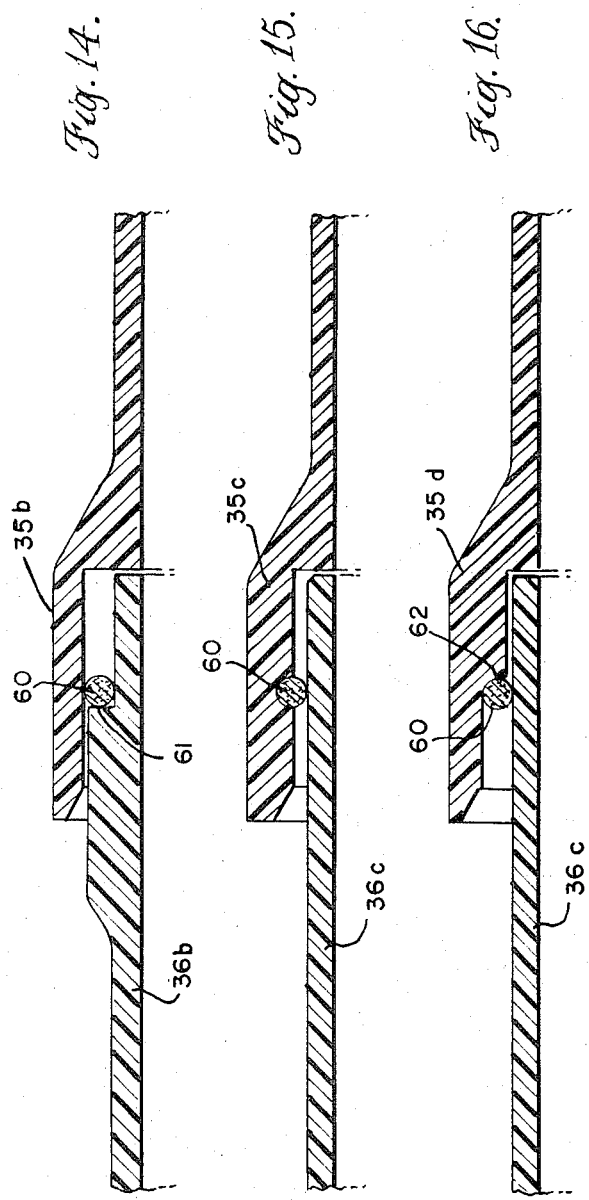

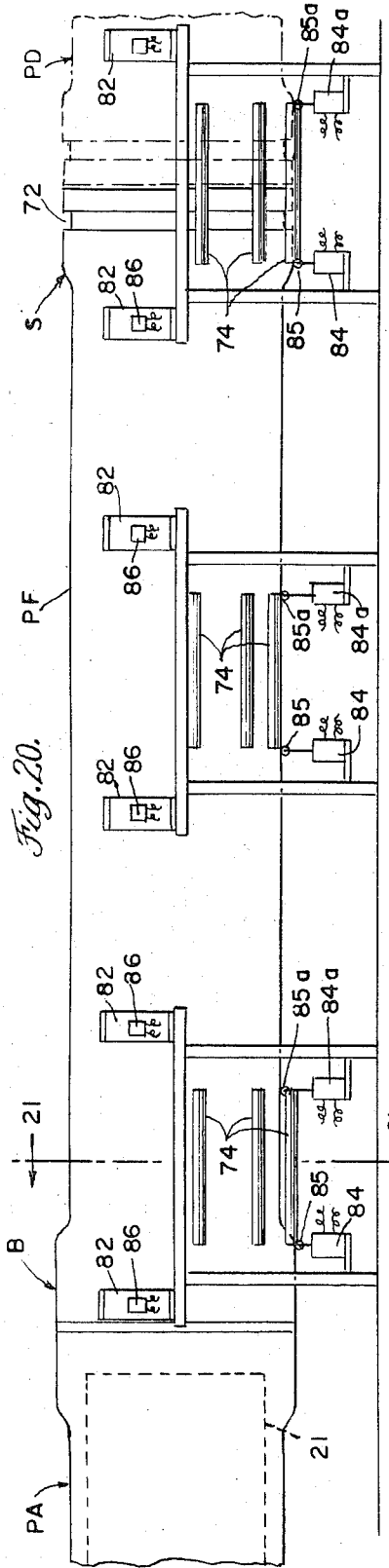
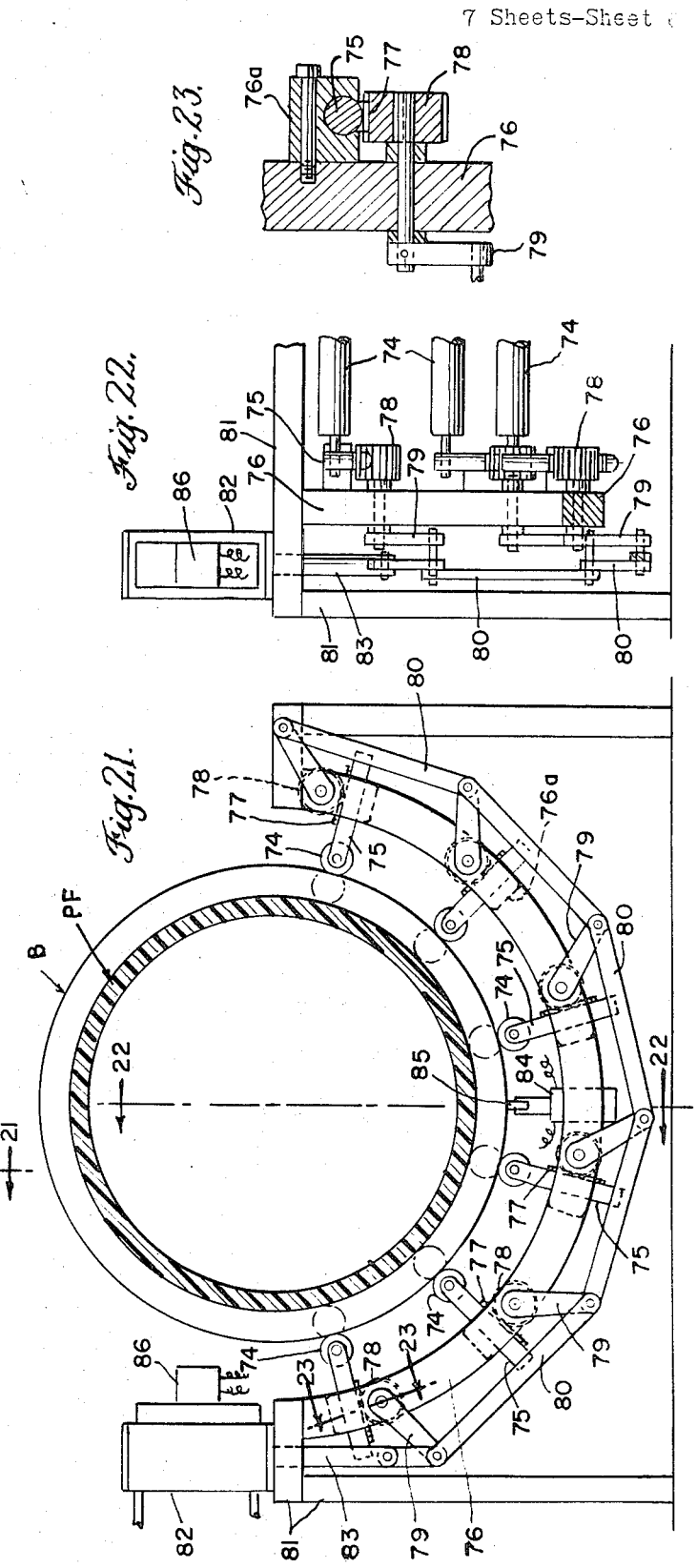

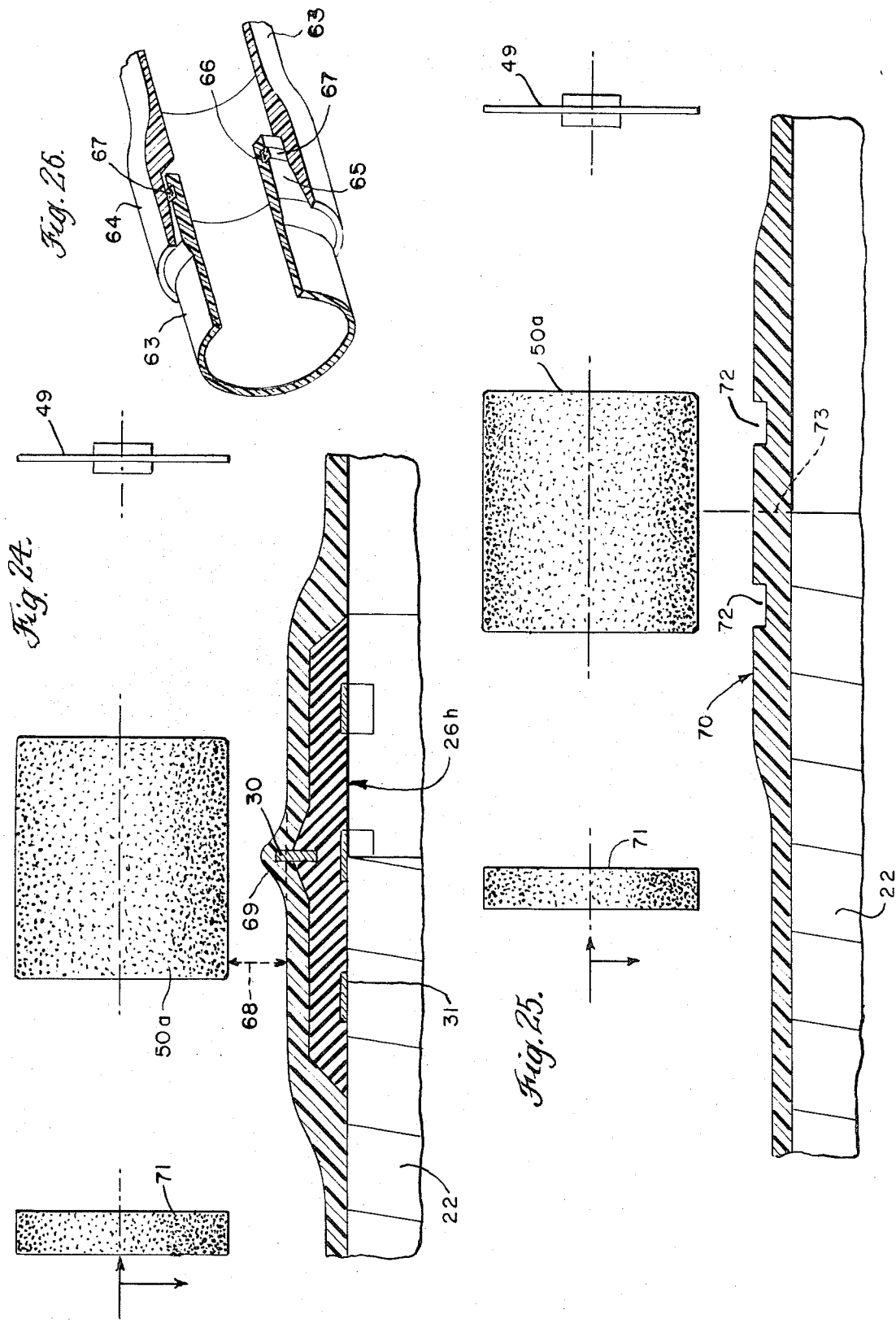

3,784,667
METHOD FOR MANUFACTURING PIPES
Frede Hilmar Drostholm, 2950 Vedbaek, Denmark, and Leonard S. Meyer, Columbia, S.C.; said Meyer assignor to said Drostholm
Filed Mar. 22, 1972, Ser. No. 237,120
Int. Cl. B29d 23/08
U.S. Cl. 264—145  9 Claims

ABSTRACT OF THE DISCLOSURE

The method and apparatus provide for production of pipe lengths having bell and spigot ends adapted to cooperate with each other serially in laying pipeline. The technique provides for continuous production of pipe, with bell portions spaced at intervals, the bell portions being divided or severed in order to provide a bell end on the adjacent ends of the pipe lengths formed by the division. At points intermediate to the bell portions the pipe is also divided or severed in order to provide pipe lengths having spigot ends at one end and bell ends at the other end.

---

This invention relates to the production of pipes and is particularly concerned with method and apparatus providing for continuous production of pipe lengths having bell and spigot ends. The invention, moreover, is especially concerned with the continuous production of such pipe lengths formed of resin materials, especially fiber reinforced thermosetting resin materials such as the polyester resins.

Continuous production of pipe or tubing or polyester materials has been achieved in various ways, but, in general, such continuous production techniques do not provide for the formation of discreet pipe lengths each having bell and spigot ends at opposite ends thereof. In accordance with certain of the prior techniques the continuously formed pipe has been severed or cut to form the desired pipe lengths, and thereafter, in a separate operation each pipe length is provided with a bell end, as by machining an end of the pipe length or by securing a separately formed bell to an end of the pipe length. In accordance with another prior technique the cut lengths of the pipe are interconnected by means of coupling sleeves instead of providing a bell end at one end of each pipe length. The formation of such separate coupling sleeves also represents an uneconomical operation and is further disadvantageous as it requires the sealing of two joints at each pipe coupling, instead of only a single joint seal as is needed with pipe lengths having a spigot end at one end and a bell end at the other.

One reason why it has not been practical heretofore to provide bell ends on continuously formed tubing to be used for pipes is that the technique employed did not readily admit of the periodic introduction of a means providing for formation of the bell enlargement. For example, in prior techniques for continuously making fiber reinforced tubular resin laminates, the resin impregnated fibrous reinforcement was wound upon a core or mandrel and then advanced with a sliding motion upon the surface of the mandrel in a direction toward an end thereof. In order to form a bell enlargement in such a system, it would be necessary to apply an annular bell forming mold element to the mandrel and to wind the resin impregnated reinforcements over the mold element, but this has not been practicable because of the lack of any technique for sliding the bell molding element along the mandrel with the tubing or pipe being made.

Tubing or pipe has also been continuously formed by extrusion of resin materials, but here again it is not practicable to introduce periodic bell enlargements by extrusion techniques.

In accordance with the present invention these and other problems of continuously producing pipe lengths having bell ends are overcome in a novel manner, according to which the pipe is continuously formed upon a mandrel having an axially moving mandrel surface, instead of the fixed mandrel surface commonly used heretofore. Moreover, in accordance with the technique of the present invention annular bell forming mold elements are periodically applied to the moving surface of the mandrel upstream of the station at which the resin impregnated fibrous reinforcements are applied in order to build up the laminate. The bell forming mold elements are preferably constructed so as to adhere to the moving surface of the mandrel in the position selected for application thereof, for instance by the employment of paramagnetic inserts assuring that the mold elements will move with the mandrel surface in the desired position.

In accordance with this technique, the mold elements are carried by the axially moving surface of the mandrel into, through, and beyond the station or stations where the laminate is built up, and in this manner piping is continuously delivered from the mandrel in a form in which the bell enlargements occur in spaced intervals.

According to the invention the piping is then preferably severed or cut both within the bell enlargements and also at points intermediate the bell enlargements thereby providing for continuous production of pipe lengths, each of which has bell and spigot ends at the opposite ends thereof.

It is also contemplated according to the invention that the structure of one or both of the bell and spigot ends may be increased in thickness by application of laminate material in excess of the amount of such material used to form the body of the pipe between the bell and spigot ends.

In accordance with one embodiment the invention also contemplates introduction of sealing gaskets in the bell ends of the pipe lengths, this being accomplished in the operation in a manner providing for molding or embedment of a portion of the sealing ring directly in the resin or laminate structure of which the pipe is being formed. In this way the invention eliminates the necessity for a separate operation or for separate operations such as heretofore commonly employed in machining an internal groove within the bell end of a pipe and inserting a sealing gasket into such groove.

In accordance with another embodiment of the invention, provision is made for forming a gasket groove in the spigot end of the pipe, instead of in the bell end thereof.

In addition to the foregoing, the invention makes possible continuous production of pipe lengths having bell and spigot ends from fiber reinforced thermosetting resin materials and also having a thermoplastic lining applied throughout the interior of the pipe, including the interior surface of the bell end thereof. In this way the invention takes advantage of the high strength fibrous reinforced thermosetting resins while, at the same time, overcoming disadvantages incident to the characteristic porosity of such fibrous reinforced thermosetting resins.

In accordance with another aspect of the invention a novel arrangement is provided for effecting the cutting or severing of the piping within the enlarged bell regions and also within the regions providing spigot ends thereby providing for accuracy of dimensioning of the bell and spigot ends of the pipe lengths being produced.

How the foregoing and other objects and advantages are attained will appear more fully from the following description referring to the accompanying drawings in which:

FIGS. 1, 2, 3, 3a and 4 illustrate somewhat diagrammatically and in outline a sequence of operational steps carried out in the practice of this invention in the continuous production of pipe lengths having bell and spigot ends;

FIG. 5 is an enlarged elevational view of portions of the equipment shown in FIGS. 1 to 4 but showing the bell forming mold element in axial section;

FIG. 6 is a transverse sectional view through portions of the equipment shown in FIG. 5, this view being taken as indicated by the section line 6—6 on FIG. 5;

FIG. 7 is a transverse sectional view taken as indicated by the line 7—7 on FIG. 5, this view showing the manner of joining the ends of the split ring comprising the bell forming mold element;

FIG. 8 illustrates a modification of a bell forming mold element useable in the arrangement of FIGS. 1 to 7;

FIG. 9 is a further enlarged fragmentary view of a portion of assembled bell and spigot pipe ends as formed by the technique illustrated in FIGS. 1 to 8;

FIG. 10 is a view similar to FIG. 9 but illustrating an alternative configuration of bell and spigot pipe ends which may be formed in accordance with the present invention;

FIGS. 11, 12 and 13 are views illustrating alternative bell forming mold elements useable in the technique of the present invention;

FIGS. 14, 15 and 16 are views similar to FIGS. 9 and 10 but illustrate still other forms of bell and spigot pipe ends which may be provided according to the present invention;

FIGS. 17, 18 and 19 are views illustrating alternative ways of interconnecting the ends of split ring mold elements employed for molding the bell enlargements;

FIG. 20 is a general outline elevational view illustrating another embodiment in which the equipment includes supporting devices for the pipe being made after delivery thereof from the mandrel on which the pipe is formed;

FIG. 21 is an enlarged transverse sectional view taken as indicated by the section line 21, 21 applied to FIG. 20;

FIG. 22 is a fragmentary view taken as indicated by the line 22, 22 on FIG. 21;

FIG. 23 is an enlarged detail sectional view taken as indicated by the section line 23, 23 on FIG. 21;

FIG. 24 is an enlarged longitudinal sectional view similar to FIGS. 11 to 13 inclusive but illustrating a different embodiment of the bell enlargement being formed in the pipe, this view also showing certain cutting or grinding elements employed of the kind also illustrated above in FIGS. 1 to 4 inclusive;

FIG. 25 is a view similar to FIG. 24 but illustrating a spigot portion of the pipe being made; and FIG. 26 is a view of a pipe joint formed with pipes having bell and spigot ends conforming with FIGS. 23 and 24, a portion of this figure being broken out and shown in section.

Although various features of the method and apparatus of the invention are useful in the making of pipe from a variety of resin materials, the invention is especially useful in the making of pipe formed of fiber reinforced thermosetting resin materials preferably also having a thermoplastic lining. Hereinafter, the invention is described in connection with the production of pipe lengths having bell and spigot ends and formed of fiber reinforced thermosetting resin materials, with a thermoplastic lining extended throughout the pipe, including the bell end thereof.

As hereinabove mentioned the invention provides for the continuous production of the pipe lengths on a mandrel and, in accordance with the invention, the mandrel employed is one having an axially moving surface on which the pipe is built up and from one end of which the completed pipe is delivered. An example of a mandrel structure suitable for the present purposes is disclosed in Poulsen Pat. No. 3,464,879, and since the specific structure of the mandrel is not a part of the present invention per se, the details of that structure are not included herein, particularly since reference may be had to the aforesaid Poulsen Patent for further information. However, the mandrel structure herein is illustrated somewhat diagrammatically or in outline. The mandrel is adapted to be supported by a standard or supporting structure shown at 20 and includes a generally cylindrical or tubular member 21. The moving mandrel surface is defined by a band, preferably a steel band such as indicated at 22, the band being fed to and wound upon the mandrel in a helical path providing a multiplicity of edge to edge helical and turns supported on the tubular structure 21, for instance by means of supports indicated at 23 in FIG. 7. These may include ball or rotative elements 24 serving to reduce friction in the band support and provide freedom for motion of the band turns. Rotative supports of this type are more fully disclosed in co-pending U.S.A. application of Frede Hilmar Drostholm, Ser. No. 171,921, filed Aug. 16, 1971. At the right hand end of the tubular structure 21 as shown in FIGS. 1 to 4, the steel band 22 is drawn or fed off the end of the supporting tube and is guided and fed axially through the tube to the left hand end for return into the feed path leading the band back into the helical turns which define the moving surface of the mandrel. It will thus be seen that the band 22 comprises a loop which is continuously fed throughout the helical turns in a direction from left to right in FIGS. 1 to 5 and then from right to left axially in the center of the structure, and back into the helical path.

The mandrel arrangement as described provides a mandrel surface which moves axially of the mandrel from left to right as viewed in FIGS. 1 to 5, and this surface may also be rotative, for instance rotative in the direction indicated by the arrows in FIGS. 6 and 7. Various materials are delivered to the moving mandrel surface in order to build up the desired pipe structure and these materials preferably include several layers or fiber reinforced thermosetting resin material, three such layers being indicated at 25. In a typical case, these layers comprise glass fiber webs or bands of glass fiber rovings impregnated with a liquid thermosetting resin, for instance, a polyester resin, the several webs or bands being applied one on top of another in order to build up a laminate. This may be accomplished in a variety of known ways and by means of a variety of known types of equipment such, for example, as so called filament winding apparatus by means of which the webs or bands are laid upon the mandrel as the mandrel rotates. Since this technique and the apparatus employed forms no part of the present invention per se, it is not herein illustrated or disclosed in detail it being sufficient for an understanding of the present invention to know that the fiber reinforced thermosetting resin laminate is built up upon the mandrel, for instance, in layers such as indicated at 25.

After application of the laminate layers 25, the laminate is advanced by the axially moving mandrel surface into and through a heating or curing zone defined, for example, by an annular heating chamber 0 through which the mandrel extends. Any suitable heating means may be provided in this chamber, for instance heating lamps (not shown) distributed around the circumference of the mandrel. The heating provided by this chamber may be employed to cure and solidify the thermosetting resin material of the laminate and the temperature of heating will depend upon the particular thermosetting material and also the catalyst system being used. In some instances the resin and catalyst may be formulated to provide for thermosetting or curing of the resin at room temperature, in which event application of heating in the chamber 0 may not be necessary, although it is preferred to employ the chamber at least for temperature regulation, if not for heating, thereby assuring a uniform temperature condition for the curing operation which is not subject to fluctuations as a result of ambient temperature changes.

It is also to be mentioned that while most of the thermosetting resin materials preferably employed in the practice of the invention are liquid or substantially liquid in the uncooled condition in which they are applied, this is not necessarily so and uncured thermosetting resins in solid state may also be utilized.

It is contemplated that the main structural body of the pipe being formed should be built up in this manner, preferably by the use of fiber reinforced thermosetting resin materials. Although it may not always be required or necessary, the invention also contemplates introduction of a lining with the pipe, preferably a thermoplastic resin lining within the thermoset resin laminate. This may be accomplished in the manner disclosed in our co-pending application Ser. No. 236,892 filed Mar. 22, 1972. In this way the pipe may be provided with a substantially impervious lining layer and thus may be used with liquids or gases which, otherwise, would have a tendecy to penetrate or bleed through the relatively porous structure of the typical fiber reinforced thermosetting resin laminates.

How this lining is introduced will be explained more fully hereinafter, but attention is now directed to the arrangement of the invention providing for periodically forming enlargements or bell structures in the pipe being fabricated, so that discrete pipe lengths having bell and spigot ends may be produced on a continuous basis. In general, this is accomplished according to the present invention by periodic application to the mandrel upstream of the region where the resin materials are applied, of a bell forming mold element comprising an annulus or ring applied to the moving mandrel surface. This forms an enlargement on the mandrel surface over which the resin materials are applied, thereby molding a bell structure or enlargement which will subsequently serve to form a bell end on a pipe length.

The bell forming mold element is shown in FIGS. 1 to 5 and 7, and the construction and shape of this mold element will best be understood from examination of FIG. 5. The mold element comprises a split ring or sleeve 26, preferably formed of a yielding or deformable material, for instance, an elastomeric material. Advantageously the material selected for this purpose comprises a rubber type material having relatively high temperature resistance, for instance silicone rubber. The mold element 26 may be provided with internal cavities or cavities opening on the interior surface in order to reduce the total quantity of rubber employed.

When formed of rubber or resilient material as is preferred, the split ring is desirably proportioned so that it must be stretched somewhat in order to extend around the entire circumference of the moving mandrel surface, and the adjacent edges at the line of split are desirably secured to each other in order to retain the mold element in position around the mandrel with the material of which it is formed, distended or under tension. One example of a means for interconnecting the adjacent edges at the line of split is illustrated at FIG. 7. Here it will be seen that the adjacent edges at the line of split are provided with mechanically interlocking parts 27. Alternatively the adjacent edges at the line of split may be adhesively interconnected.

The mold element 26 has an axial section as clearly seen in FIG. 5 with tapered end portions 28, 28, and a central enlargement 29 provided with a groove adapted to receive a split annulus or ring 30 which projects radially beyond the largest diameter of the enlargement 29 for a purpose to be described hereinafter. At the inner surface of the mold element recesses are provided to receive magnets 31. These magnets may be adhesively secured in the recessess in the mold element if desired, but whether or not secured in the recesses, the magnets will serve to maintain the position of the mold element with relation to the moving mandrel surface, thereby maintaining the bell forming mold element in the exact position desired for the performance of its function of molding the bell enlargements subsequently to be used in the formation of the bell ends of the pipe lengths being made.

In the preferred practice of the invention, the mold element 26 also serves to carry and position packing or sealing gaskets 32. These gaskets must also be split with the ends thereof secured to each other, for instance, by adhesive bonding so that the gaskets will remain in proper position as carried by the mold element 26 during the advancement thereof through the work stations at which the resin materials are applied. Each gasket 32 advantageously is provided with flanges such as indicated at 33 and 34 projecting inwardly from the main body of the gasket and received in correspondingly shaped grooves formed in the mold element 26.

Before describing the manner of building up the structure of the pipe in relation to the mold element illustrated in FIG. 5 and described above, reference is first made to FIG. 9 which comprises an enlarged longitudinal, sectional view through a portion of a pipe joint formed by means of the mold element 26 and gasket 32 arrangement shown in FIG. 5. From FIG. 9 it will be seen that the inwardly projecting flanges 33 and 34 of the gasket 32 serve a joint sealing function when the bell end 35 receives the spigot end 36 of an adjoining pipe length.

The mold element 26 and the associated gaskets 32 and the rings 30 may readily be applied to the mandrel while the operation is proceeding, with the mandrel turning and with the surface thereof moving axially, this application of the mold element being effected at a position upstream of the point where any of the resin materials are applied. This is the position illustrated in FIGS. 1 and 5. If desired a parting compound or film may be applied to the mandrel before the mold or any resins are applied.

As the mold element is carried with the moving mandrel surface, it advances into the zone or station where the thermoplastic resin is applied to the mandrel in order to develop the lining layer for the pipe being made. For this purpose (see FIGS. 1, 5 and 6) the mandrel surface and also the mold element 26 is subjected to a preheating operation, for instance, by means of hot air supplied through a connection 37 and distributed by means of a hood 38. The preheated surface of the mandrel and also the preheated mold elements 26 when they periodically arrive at this work station move into the zone of delivery of particulate thermoplastic resin material as supplied through the chute 39 from the supply hopper 40 (see FIGS. 5 and 6). Because of the preheating of the mandrel surface and of the mold element, the thermoplastic resin particles adhere thereto. The resin material deposited on the mandrel and the bell forming mold is then subjected to further heating as by hot air supplied through the duct 41 and distributed by the hood 42 thereby causing particles of the thermoplastic resin to fuse together and form a film or coating.

Aggregate particles are then delivered to the soft thermoplastic resin film, as by the chute 43, extended downwardly from the supply hopper 44. These aggregate particles desirably comprise porous or jagged granules of stone, coke or the like. The aggregate particles are then partially embedded within the thermoplastic film, being pressed, for example, by the roller 45 mounted on the spring pressed support 46, the spring mounting of this roller serving to accommodate the roller to the surface of the mandrel and of the mold element 26.

The thermoplastic layer with the embedded aggregate particles is then cooled as by cooling air supplied through the duct 47 and distributed by the hood 48. This solidifies the thermoplastic resin, and the coated areas of the mandrel and of the mold elements 26 then advance into the zone where the thermosetting resin laminate is built up, as by application of the webs or roving bands 25 above described.

The arrangement just described for applying the thermoplastic resin layer, the aggregate particles, and the thermosetting resin laminate conforms with the arrangement more fully disclosed in our co-pending U.S.A. application Ser. No. 236,892, filed Mar. 22, 1972. The thermoplastic layer serves to form the pipe lining, the aggregate serves as a bonding medium between the thermoplastic lining layer and the thermosetting laminate, and the thermosetting laminate constitutes the major strength structure of the pipe. However, in accordance with the present invention the build-up of the resin layers is effected not only on the moving mandrel surface but also on the periodically introduced mold elements for forming the bell enlargements desired. Indeed the resin material applied over the mold elements provides not only for the shaping of the bell enlargements desired but serves also to mold the sealing gaskets directly into the material from which the bell ends of the pipe lengths are formed.

The over sequence of steps followed in forming the pipe lengths having bell and spigot ends is graphically shown in FIGS. 1 to 4 inclusive. Thus in FIG. 1 it will be seen that a mold element 26 has been applied to the moving mandrel surface upstream of the point of application of the thermoplastic resin lining, and this figure indicates also the point in the cycle of operations at which the cut off saw 49 has just completed the operation of severing the preceding pipe length from the one extended to the left of the plane of the saw. It will be understood that the saw is mounted as a "flying" saw which will follow the advancement of the pipe during the cutting operation.

In FIG. 2 the pipe being formed has advanced to the right sufficiently to bring the mold element 26 into the region of the thermoplastic resin applying equipment, so that the thermoplastic resin lining is now being applied over the mold element. The advancement continues and carries the mold element through the zone of application of the thermosetting laminate 25. As shown in FIG. 3 the advancement continues still further to the right and brings the region of the bell enlargement molded by means of the mold element 26 through and beyond the curing oven 0. At this time the grinding wheel 50 is brought down to engage the resin layers as applied to the outer periphery of the split annulas 30, this action taking place at a point closely adjacent to the delivery end of the mandrel surface. FIG 3a illustrates the condition following a slight additional advance beyond the position of FIG. 3. Here it will be seen that the right hand pipe length PR which has now been completely formed, has been separated from the left hand pipe length PL which, at this time, is not yet completed. Because of the severence brought about by the grinding whel 50 in the mid-region of the mold element 26, each of the pipe lengths PR and PL are provided with bell ends B. Moreover, each bell end will have molded within its interior one of the sealing gaskets 32.

Because of the elastic character of the mold element 26 and the fact that it was initially placed upon the mandrel under tension, when the mold element 26 is delivered from the end of the mandrel, it is then free to shrink somewhat and this action facilitates separation of the mold element from the bell ends formed thereby. Upon removal of the remaining portion of the severence ring 30 and insertion of a new severence ring, the mold element 26 may then be reused in a subsequent bell forming operation. The use of silicone rubber for the mold element 26 is not only advantageous because of its resilience and deformability, thus facilitating the application of the mold element and also its removal, but in addition this material is desirably employed because of its high temperature resistance and because it has a surface characteristic which is readily releasable from various other resin materials, without even employing a mold release compound. To enhance separation, such mold release compounds may, of course, be employed.

FIG. 4 illustrates a still further stage of the operation in which the pipe length identified in FIG. 3a as PL has been further advanced until it has been delivered in its entirety from the end of the mandrel, this position corresponding to the position shown in FIG. 1. In FIG. 4, however, the cut off saw 49 is shown in action, severing the pipe length PL from the upstream section of the pipe being formed and thereby providing a pipe length having bell and spigot ends as contemplated. FIG. 4 also shows the application of the next succeeding mold element 26, this being applied in the same position as shown in FIG. 1 and described above. FIGS. 1 to 4, therefore, show a complete cycle of operations.

From the foregoing it will be seen that the mold element 26 forms a bell enlargement which is divided or cut in the mid-region thereby providing the bell end on two pipe lengths. It will further be observed that the cut off saw 49 operates to cut the pipe in a plane intermediate the periodically formed bell enlargements. Either or both of the bell and spigot regions of the pipe may have more of the laminate material built up thereon in order to increase the strength in those regions.

From FIGS. 5 and 9 it will be noted that the inclined surfaces 28, 28 of the mold 26 serve to form the inclined walls of the bell ends of the pipe lengths as indicated at 51. The central enlargement 29 of the mold element 26 serves to define the flared entrance end of the bell, as indicated at 52 in FIG. 9. This facilitates insertion of the spigot end into the bell. From FIGS. 5 and 9 it will also be observed that the flanges 33 and 34 of each sealing gasket 32 serve to mount the sealing gasket on the mold element 26 during fabrication of the pipe, but serve as sealing elements projecting between the adjacent walls of the bell and spigot of a pipe joint as is illustrated in FIG. 9.

It is to be understood that the invention also contemplates the utilization of the mold element for forming a bell enlargement in the pipe in cases where the sealing gasket is not molded into the bell structure as in FIGS. 1 to 9. For instance, as shown in FIG. 10, a bell may be molded in substantially cylindrical form as illustrated at 35a, and the joint may be completed by employment of a spigot end 36a having a groove for receiving a sealing gasket 53. Such a groove may be machined in the spigot end after molding of the pipe.

As above mentioned, the split annulus which forms the mold element may have its ends interconnected in a variety of ways, one such alternative being illustrated in FIG. 8. Here the ends of the annulus (here indicated at 26a) adjacent the plane of the split are shown as having strips 54, 54 connected therewith and adhesively bonded to each other. Alternatively, elements 54 bonded to the ends of the split annulus may comprise magnetic elements which will serve to hold the ends together.

Still other arrangements for interconnecting the adjacent edges or surfaces of the split mold annulus are illustrated in FIGS. 17, 18 and 19. In FIG. 17 a thin mold element 26b is indicated as having overlapped end portions secured together as by an adhesive tape strip or the like shown at 55. Here the thin strip may be spaced from the mandrel 22 and also secured thereto by means of magnetic pieces 56.

In FIG. 18 a mold element 26c is indicated as having overlapped interlocking portions maintaining a substantially smooth exterior surface, and in this arrangement an adhesive strip 57 may also be employed to fasten the ends together. Magnetic spacers 56 may be used as in FIG. 17.

A similar construction is shown in FIG. 19 except that the mold element 26d merely has its ends abutted together and fastened by means of the adhesive strip 57.

In accordance with another alternative construction of the mold element 26, the mold element may be formed of a distensible or deformable material having magnetic properties so that the material of which the mold is formed will itself adhere to the mandrel surface. For this purpose so called magnetic rubber compounds may be employed, for instance, silicone rubber compound having magnetic particles dispersed therein.

Other cross sectional shapes of molding elements which may be employed are illustrated in FIGS. 11, 12 and 13.

In FIG. 11 the mold element 26e is provided with a central groove 58 which is covered by a tape strip 59, thereby providing an annular space to accommodate the periphery of the cutting saw 49a, which is here used instead of the grinding wheel 50 of the embodiment of FIGS. 1 to 9. The mold element 26e will, of course, be split as in the preceding embodiments and split O rings 60 are received in recesses in the mold element, the ends being secured together, as by adhesive, so that in the formation of the pipe being made, the O rings will be molded within the bell enlargement and will serve as sealing gaskets in the pipe joints to be formed. This arrangement has the advantage that the gasket rings themselves may assist in holding the mold element 26e on the mandrel.

In FIG. 12 the mold element comprises a formed strip or sheet 26f which may be made of magnetizable metal and which is spaced from the moving mandrel surface 22 and also is secured thereto by means of spacing magnets 56 of the kind described above in connection with FIGS. 17 to 19. Here again it is contemplated that a cut off saw 49a be employed instead of the grinding wheel 50 of the first embodiment, this saw being actuated to sever the bell enlargement and form two bell ends for the adjoining lengths of pipe. In this case it is contemplated that the metal strip of the mold element 26f will be cut by the saw and discarded.

In FIG. 13 there is illustrated still another embodiment in which the mold element 26g is formed of porous or expanded resin or rubber type material, it being contemplated here that the cut off saw 49a be used to divide the bell enlargement. The saw would also be expected to enter the material of the mold element in view of which the mold element would be disposable. Other forms of disposable molds may be employed, including molds formed of fiber or cardboard which may be made inexpensively and thus be economical to use in the process.

If desired, in order to facilitate separation of the mold element from the formed pipe lengths, the mold element may comprise an inflatable, resilient or distensible structure having grooves therein for use in positioning sealing gaskets. Such an element may be deflated after formation of the pipe and the relatively limp resulting structure may readily be separated from the gasket and also from the bell ends of the pipe lengths being formed.

With the arrangements of FIGS. 12 and 13, it is contemplated that the bell ends of the pipe lengths formed thereby would be employed in combination with spigot ends appropriately shaped or machined to accommodate sealing rings in the completed joints. An example of an arrangement of this kind is shown in FIG. 14 in which the bell end 35b is shown as cooperating with a spigot end 36b having a shoulder 61, a sealing gasket 60 being introduced between the parts.

The alternative forms of joints illustrated in FIGS. 15 and 16 may also be produced in accordance with the invention. Each of these comprises a simple cylindrical spigot end 36c cooperating with the bell end. In FIG. 15 the bell end 35c has a groove formed therein receiving an O ring gasket 60, in a manner similar to that illustrated in FIG. 11, although, if desired, the groove for receiving the gasket 60 may be machined in the interior of the bell end, instead of being provided by molding as in FIG. 11.

FIG. 16 is similar to FIG. 15 except that the bell end 35d is provided with a shoulder 62 for cooperation with the gasket ring 60.

Turning now to the embodiment illustrated in FIGS. 20 to 26 it is first pointed out that in this embodiment provision is made for producing pipe lengths having bell and spigot fittings at opposite ends and in which the spigot fitting is thickened as compared with the body of the pipe and also is provided with a groove to receive the joint gasket. This construction is plainly shown in FIG. 26 in which a typical joint is illustrated, the main body of the pipe lengths being indicated at 63, a bell end at 64 and a spigot end at 65. The spigot end is provided with a groove for receiving a sealing gasket 67.

In order to produce the pipe lengths having bell and spigot ends as just described, the embodiment of FIGS. 20 to 26 contemplates the use of a mold element 26h (see FIG. 24) which may be formed of silicone rubber and which is shaped similarly to the mold element 26 shown in FIG. 5, except that the mold element 26h is not provided with grooves to receive elements of a sealing gasket to be molded to the bell enlargement, as in the embodiment illustrated in FIG. 5. The gasket is not applied in the bell enlargement because in the embodiment here under consideration the gasket is to be received in a groove formed in the spigot end of the pipe.

FIG. 24 also illustrates a grinding wheel at 50a, similar to that described above with reference to FIGS. 1 to 4, although the grinding wheel is here shown as being of greater axial dimension. This grinding wheel is desirably mounted and controlled so as to move toward the bell enlargement, for instance through the distance indicated at 68, so that as the bell enlargement passes the grinding wheel, the wheel will serve not only to cut off the portion of the laminate or resin material 69 overlying the parting ring 30, but also to grind and thereby accurately dimension the adjoining cylindrical surfaces of the bell enlargement. As in the embodiment shown in FIGS. 1 to 4, the embodiment of FIGS. 20 to 26 also includes a cut off wheel 49 which may be programmed to effect the desired cut off in the spigot region of the pipe, as described below with particular reference to FIG. 25.

At appropriate intervals, in regions between the bell enlargements, the equipment for applying a laminate material, preferably liquid polyester resin and glass fiber reinforcement, is operated to increase the application of the laminate and thus provide a thickened region as indicated at 70 in FIG. 25. This thickened region serves to provide the spigot ends of a pair of pipe lengths, and for this purpose a grinding wheel such as indicated at 71 is provided and appropriately programmed to approach and move with the pipe being formed at intervals providing for the formation of the gasket grooves 72,72. As the pipe continues to advance past the grinding wheel 50a, this wheel again approaches the pipe and will serve to accurately dimension the spigot region. As the pipe advances still further, the cut off wheel 49 is brought into operation in order to sever the pipe, for instance on the line indicated at 73, thereby providing a pair of spigot ends on a pair of pipe lengths, each having a gasket groove 72.

In the embodiment of FIGS. 20 to 26, a special form of pipe supporting mechanism is provided extending beyond the end of the mandrel 21. According to this arrangement, at several stations beyond the end of the mandrel, for instance at the three stations indicated in FIG. 20, a group of pipe supporting rollers 74 are arranged to provide a cradle in which the lower portion of the pipe is received (see also FIGS. 21 to 23).

From FIGS. 20 to 23 it will be seen that the rollers 74 are each journaled in a pair of supports located at the ends of the rollers, such supports being indicated at 75. The supports 75 are mounted with freedom for motion inwardly and outwardly by means of an arcuate supporting structure 76 having guide brackets 76a. Each support 75 also has rack teeth 77 with which pinions 78 are meshed, so that rotation of the pinion causes the support 75 to move inwardly or outwardly in the guide brackets 76a. All of pinions 78 for the supports for each group of rollers 74 are interconnected for operation in unison. This mechanism includes pinion rotating arms 79 and links 80 interconnecting the outer ends of the arms 79. The supporting frame structure 81 which also serves to support each of the arcuate members 76 carries a double acting fluid pressure actuating device 82 having a piston stem 83 projecting downwardly and interconnected with the links 80 so that upon upward or downward movement of the piston stem 83 all of the pipe supporting rollers 74 will be moved inwardly or outwardly at the same time.

This mechanism is provided so that support is given to the pipe as it is delivered from the mandrel and so that the support will be effective not only in the region of the pipe between the spigot and bell enlargements, but also in the regions of the spigot and bell enlargements. The manner in which this is accomplished will be understood from reference to FIG. 20 which illustrates one pipe length in full at PF and which also illustrates in dotted lines at PD a portion of a pipe which has been completed and which will shortly be removed or taken away from the production equipment. Still further in FIG. 20, a portion of another pipe length is shown at PA, this pipe length extending upstream from the pipe PF, back into the portions of the production equipment such as shown in FIGS. 1 to 7. Note further that in FIG. 20 the spigot end of the pipe PF is indicated at S, whereas the bell end is indicated at B.

In the position shown in FIG. 20 the bell enlargement of which the bell end B is formed is just reaching the region of the first group of pipe supporting rollers 74. A control switch 84 having a feeler 85 is mounted in a position adjacent to the upstream end of the first group of rollers 74 and this switch control is connected with the control device 86 associated with the dobule acting fluid pressure actuating device 82. In operation, when the feeler 85 senses the bell enlargement, it operates the devices 82 to shift the rollers 74 radially outwardly in order to accommodate the bell enlargement of the pipe which is arriving at that station at that time. Another control switch 84a having a feeler 85a at the downstream end of the rollers 74 will sense when the bell enlargement leaves the region of the rollers 74. The switch 84a and its feeler 85a are used to effect radially inward movement of the rollers 74, so that they will again be in the proper position to support the body of the pipe. It will be noted that the feelers 85 and 85a are located respectively at the upstream and the downstream ends of the rollers 74.

Similar action occurs when the spigot enlargements reach the feelers 85 and 85a, so that the rollers will provide the desired support not only in the region of the body of the pipe but also in the region of the bell and spigot enlargements at the two ends thereof.

Controls of the kind described, including feelers 85 and actuating devices 82 are provided for each group of rollers 74. In this way, with a plurality of roller groups, for instance with three groups as illustrated, the pipe lengths will be stably supported until all operations are completed.

As will be understood, in cases where the enlargements in the pipe occur at regular intervals, the sensing elements 85 and 85a need not necessarily be located adjacent the ends of the group of rollers controlled by the sensing elements, but may be located to engage a following enlargement.

In considering the resin materials which are preferably used in accordance with the invention, it is first noted that the thermosetting laminate itself may be made up of any of the commonly used laminating resins. The polyester resins are well suited to this purpose, such as general purpose types made up of styrene monomer—unsaturated alkyd blends containing a peroxide catalyst.

For the liner any of a wide variety of thermoplastic resins may be employed of which typical examples are polyethylene, polypropylene and polyvinyl chloride. Other thermoplastics which may be employed include polymethylmethacrylate and acrylonitrile butadiene styrene.

In connection with the technique disclosed in the present application, it is especially to be noted that the molding elements for forming the pipe bell ends are applied to a moving mandrel surface, i.e., a moving mandrel surface on which the various layers of which the pipe is constructed are also applied, so that no relative sliding motion between the mold elements and the mandrel is required. This is highly advantageous because it avoids tendency for the bell molding elements to shift from the desired position.

The use of the grinding wheel 50 in combination with the disposable annular parting ring 30, as fully described above in connection with the embodiment, is particularly advantageous because it provides an accurate technique for separating the bell enlargement into two exactly uniform halves, without the necessity for estimating or measuring from some other point spaced longitudinally of the pipe being made.

The arrangement employed constitutes a highly effective technique for the continuous production of pipe lengths having bell and spigot ends.

We claim:

1. In the manufacture of fiber reinforced resin pipe lengths having bell and spigot ends, the method which comprises applying a bell forming annular mold element to an axially moving mandrel surface to be advanced axially of the mandrel by said moving surface, applying at least one layer of fiber reinforced thermosetting resin material on the mold element and on the mandrel to be advanced axially with the mold element and with the moving mandrel surface, curing the thermosetting resin material to effect solidification thereof during said axial advancement thereof, and after solidification of the pipe severing the pipe in the region of the mold element to provide a pipe length having a bell at an end thereof.

2. A method as defined in claim 1 in which the bell mold element and the formed pipe are delivered together off the end of the mandrel and in which the severed pipe length is separated after delivery from the mandrel.

3. A method as defined in claim 2 and further including separating the bell mold element from the pipe after separation of the severed pipe length.

4. In the manufacture of fiber reinforced resin pipe lengths having bell and spigot ends, the method which comprises periodically applying bell forming annular mold elements to an axially moving mandrel surface to be advanced axially of the mandrel by said moving surface, applying at least one layer of liquid fiber reinforced thermosetting resin material on the mandrel and on the periodically applied mold elements to be advanced axially with the moving mandrel surface, heating the thermosetting resin material to effect solidification thereof during said axial advancement thereof and thereby form pipe having molded bells at spaced intervals, and after solidification of the pipe cutting the molded bells to provide pipe lengths having adjacent bell ends.

5. A method as defined in claim 4 and further including periodically cutting the pipe intermediate the molded bells to provide pipe lengths each having bell and spigot ends at opposite ends thereof.

6. In the manufacture of fiber reinforced resin pipe lengths having bell and spigot ends, the method which comprises applying a bell forming annular mold element to an axially moving mandrel surface to be advanced axially of the mandrel by said moving surface, heating the mandrel surface and the mold element, applying particulate thermoplastic resin material to the heated mandrel surface and mold element and thereby effect fusion of the particulate resin material and formation of a pipe lining, applying at least one layer of liquid fiber reinforced thermosetting resin material on the fused lining to be advanced axially therewith, heating the thermosetting resin material to effect solidification thereof during said axial advancement thereof, and after solidification of the pipe cutting the pipe in the region of the mold element to provide a pipe length having a bell at an end thereof.

7. In the manufacture of fiber reinforced resin pipe lengths having bell and spigot ends, the method which comprises applying a bell forming annular mold element to an axially moving mandrel surface to be advanced axially of the mandrel by said moving surface, applying a pipe joint sealing ring to the mold element, the sealing ring projecting radially beyond the mold element, applying at least one layer of liquid fiber reinforced thermosetting resin material on the mold element and sealing ring and on the mandrel to be advanced axially therewith, heating the thermosetting resin material to effect solidification thereof during said axial advancement with the projecting part of the sealing ring embedded therein, and after solidification of the pipe cutting the pipe in the region of the mold element to provide a pipe length having a bell at an end thereof with a sealing ring therein.

8. In the manufacture of fiber reinforced resin pipe lengths having bell and spigot ends, the method which comprises applying a bell forming annular mold element having an annular projection to an axially moving mandrel surface to be advanced axially of the mandrel by said moving surface, applying at least one layer of liquid fiber reinforced thermosetting resin material on the mold element with its annular projection and on the mandrel to be advanced axially with the moving mandrel surface, heating the thermosetting resin material to effect solidification thereof during axial advancement with the moving mandrel surface, and after solidification of the pipe cutting the pipe in the region of the mold element to provide a pipe length having a bell at one end thereof, the cutting being effected by grinding off the solidified resin material overlying said annular projection.

9. In the manufacture of fiber reinforced resin pipe lengths having bell and spigot ends, the method which comprises periodically applying bell forming annular mold elements to an axially moving mandrel surface to be advanced axially of the mandrel by said moving surface, applying at least one layer of liquid fiber reinforced thermosetting resin material on the mandrel and on the periodically applied mold elements to be advanced axially with the moving mandrel surface, heating the thermosetting resin material to effect solidification thereof during said axial advancement thereof and thereby form pipe having molded bell enlargements at spaced intervals, after solidification of the pipe cutting spaced gasket grooves in regions intermediate the bell enlargements, cutting the molded bells to provide pipe lengths having adjacent bell ends, and cuting the pipe between the spaced gasket grooves in said intermediate regions to provide pipe lengths having adjacent spigot ends each with a gasket groove.

References Cited

FOREIGN PATENTS 109,953   7/1960   Pakistan _____ 264—166

ROBERT F. WHITE, Primary Examiner

T. E. BALHOFF, Assistant Examiner

U.S. Cl. X.R.

264—159, 166, 167; 425—224, 320, 363, 457